ELECTRONIC SWITCH

Filed March 6, 1951

STUART C. ROCKAFELLOW
INVENTOR.

BY [signature]
ATTORNEY

Patented Oct. 12, 1954

2,691,745

UNITED STATES PATENT OFFICE 2,691,745

ELECTRONIC SWITCH

Stuart C. Rockafellow, Farmington, Mich., assignor to Robotron Corporation, Detroit, Mich., a corporation of Michigan Application March 6, 1951, Serial No. 214,093

2 Claims. (Cl. 315—201)

This invention relates to electronic switches and particularly to a type thereof wherein a relatively small current will control the passage of a relatively larger current between a pair of spaced terminals and involving only a negligible potential drop between said terminals.

In the art of making and breaking an electrical connection between a pair of spaced terminals, the use of a large variety of electronic switches has long been known. However, such switches have involved relatively complex apparatus or they have involved apparatus necessitating an undesirably large potential drop between said terminals when said switch is closed.

In other situations, where comparatively large currents have been present on the mechanical switching elements utilized in such a circuit, the opening of said switches has caused undesirable arcing between the contact points thereof.

Accordingly, it has long been desirable to provide a circuit constituting an electronic switch wherein a current sufficiently small as to eliminate the danger of arcing may be utilized to control a relatively large load current and wherein the apparatus itself is both simple and efficient.

Accordingly, a principal object of the invention has been to provide a circuit constituting an electronic switch which will effectively control a relatively large current and yet itself be of simple design and requiring only a few parts.

A further object of the invention is to provide a circuit constituting an electronic switch which will be of high efficiency, and, consequently, will introduce only a small potential drop between the terminals between which said switch is placed.

A further object of the invention is to provide a circuit, as aforesaid, constituting an electronic switch, in which the current passing any existing mechanical contacts is of sufficiently small magnitude that any arcing which may occur when said contacts open is negligible.

A further object of the invention is to provide a circuit constituting an electronic switch in which a relatively small current may be utilized to control the flow of a relatively large current.

A further object of the invention is to provide a circuit constituting an electronic switch which will be sturdy and capable of long life.

A further object of the invention is to provide a circuit constituting an electronic switch which can be made from standard parts.

A further object of the invention is to provide a circuit, as aforesaid, constituting an electronic switch in which there are no moving parts with the exception that in some applications there may be used a single mechanical switch which is on a low voltage and low amperage circuit.

Other objects and purposes of the invention will become apparent to persons acquainted with this type of apparatus upon reading the specification and examining the accompanying drawings.

*General description*

Figure 1:
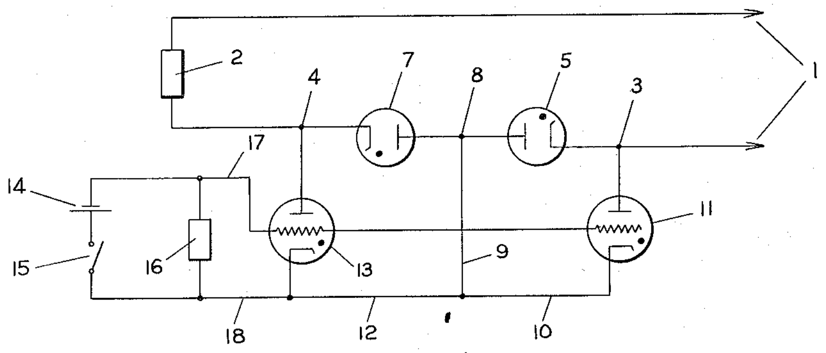
Figure 1 shows a circuit diagram illustrating the invention.

In general, the invention constitutes a pair of rectifiers connected to each other by their positive sides and having their respective negative sides connected to the terminals between which said switch is to operate. A point intermediate said rectifiers is then connected through a pair of thyratrons to each of said terminals, the anodes of each of said thyratrons being the electrode thereof by which connection is made to said terminals. An independently energized secondary, or control, circuit of relatively low potential is in a preferred embodiment connected to a suitable switch, which may be of mechanical form, and through a suitable load resistor. A connection is made from said circuit to the control electrodes of each of said thyratrons. Thus, when said mechanical switch is open and no negative potential is placed on the control electrodes of said thyratrons with respect to the cathodes thereof, a current will pass therethrough and, consequently, current will flow between said terminals between which said switch is to operate. The closing of said mechanical switch will permit a flow of current between the terminals of the source for said secondary circuit and consequently there will be a drop in potential across said control circuit and a negative potential is imposed onto the control electrodes of said thyratrons with respect to their cathodes. This will block passage of current through said thyratrons and no current will be conducted between said terminals.

*Detailed description*

Looking now at the drawing in more detail, there is shown any conventional source 1 of alternating potential and any desired load 2 supplied from said source. Terminals 3 and 4 are in series with said load 2 and are to be connected and disconnected by the circuitry constituting the electronic switch.

The terminal 3 is connected to the negative side of a rectifier 5 which may be of any convenient type, either an electric discharge device, as a diode, as shown in the drawing, or a dry disk rectifier of any commercial type, such as the well-known selenium rectifier. The positive side of said rectifier is connected to the positive side of a similar rectifier 7, and the negative side of said rectifier 7 is connected to the terminal 4. A point 8 intermediate said two rectifiers is connected by conductors 9 and 10 to the cathode of a gas filled electron discharge device 11, as a thyratron. The anode of said thyratron is then connected to the terminal 3. Said point 8 is also connected by the conductors 9 and 12 to the cathode of another gas filled electric discharge device 13, as another thyratron, and the anode thereof is connected to the terminal 4.

A source 14 of constant control potential, as a small battery, the terminals of a charged condenser, or the terminals of an alternating current source properly phased with the source 1, is connected from its positive terminal through the mechanical switch 15 and a control circuit resistor 16 to its negative terminal. A conductor 17 is connected to the resistor on the negative side of said control source and also is connected to the control electrodes of both of said thyratrons. A conductor 18 connects the cathodes of the thyratrons to said resistor on the positive side of said source. The switch is interposed between said last named connection and said source.

*Operation*

The operation of the device will be apparent from inspection of the drawing, and in the light of the foregoing description, but it will be reviewed in the interest of completeness.

Assuming first that the control switch 15 is open, the potentials on both sides of the resistor 16 are the same and the grids of the thyratrons are at the same potential as their cathodes. Hence, the thyratrons are free to conduct. As a negative pulse appears at the terminal 3 it will pass through the rectifier 5 but will be blocked by the rectifier 7. Hence, said pulse travels on the conductors 9 and 12 to the thyratron 13, and thence to the terminal 4. The reverse pulse appearing at the terminal 4 will pass through the rectifier 7 but will be blocked by the rectifier 5. Thus, it will travel on the conductors 9 and 10 to the thyratron 11 and thence to the terminal 3. So long as the potential on the control electrodes is sufficiently low that the thyratrons are able to conduct freely, conduction will occur between the terminals 3 and 4 freely and it will do so without any potential drop between said terminals excepting the negligible amount occurring in the rectifiers and in the thyratrons.

Now assuming that the control switch 15 is closed, there is a current flowing through the resistor 16 and a potential drop across said resistor. This effects a potential difference between the ends of said resistor, and, consequently between the grids and the cathodes of said thyratrons. With the value of said resistor and the magnitude of the potential applied to the control source 14 properly chosen, the thyratrons are thereby rendered non-conductive. Thus, a pulse appearing at the terminal 3 and traveling through the rectifier 5 and thence on the conductors 9 and 12 will be stopped by the thyratron 13. A pulse in the opposite direction appearing at the terminal 4 will pass through the rectifier 7 and traveling on the conductors 9 and 10 but will be blocked by the thyratron 11. Thus, conduction in either direction between the terminals 3 and 4 is instantly and positively prevented.

It will be recognized that this electronic switch will operate efficiently and accurately, and, so long as the control source 14 is of constant nature, the switch will operate without regard to the frequency of pulsations supplied by the alternating source 1. The circuit disclosed may be embodied in electrical apparatus of very rugged character which apparatus will be capable of a long life and reliable operation.

*Modifications*

Figure 2:
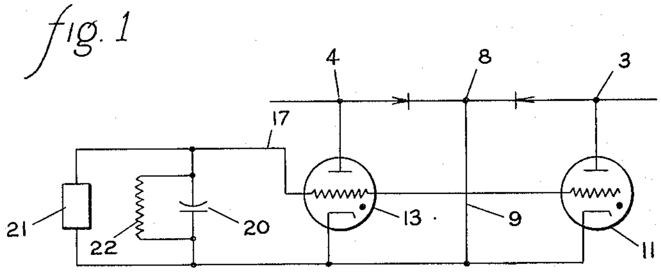
Figure 2 shows a modification.

The modification indicated in Figure 2 illustrates a different possible source of control potential. Here a capacitor 20 takes the place of the control source 14 shown in Figure 1. The function of the switch 15 becomes embodied in the supply 21, which represents any source, including other electrical circuitry, of either steady or intermittent potential. It will be recognized that when said capacitor 20 is discharged, the grids and the cathodes of the thyratrons will be at the same potential and the thyratrons will conduct to effect conduction between the terminals 3 and 4 as described above, and that when said capacitor is charged there will be a substantial difference between said grids and cathodes and said thyratrons will be rendered non-conductive. A resistor 22 may be placed in shunt with the capacitor 20 to discharge said capacitor if it is desired to effect a time lag in the permitting of conduction between terminals 3 and 4 after the termination of the charging of said capacitor, or, alternatively, in the event that such delay is not desired, said resistor may be omitted and the supply 21 arranged to permit the immediate discharge of said capacitor upon the termination of the charging current.

The supply 21 may also represent a phase shift circuit which is caused to be in or out of phase with the source 1 and thereby energize or de-energize the grids of said thyratrons in or out of phase with the pulsations of said source 1.

Figure 3:
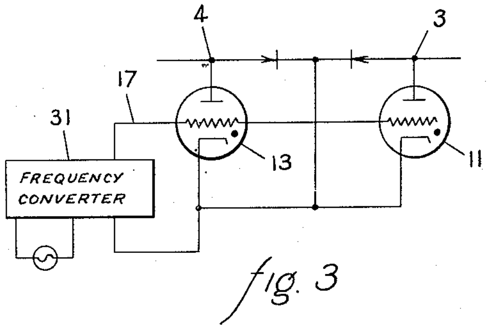
Figure 3 shows a further modification.

Figure 3 illustrates the fact that by providing any conventional means, as a frequency converter 31 for controlling the frequency of the pulses applied to the control electrodes of said thyratrons, and by providing frequencies in selectable multiples of the frequency of the alternating current source 1, it will be possible to block only selected ones and not others of said alternating current pulses, such as every second pulse or every fifth pulse. This may be of use in filtering out undesirable and regularly appearing pulses, as in certain industrial inspection devices, or it may be used merely for increasing or decreasing the total amount of current permitted to flow through the load 2.

Figure 4:
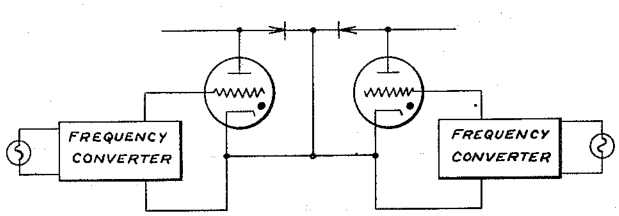
Figure 4 shows a still further modification.

Figure 4 illustrates a further modification in which the thyratron grids are separately controlled and are energized at selectable and, if desired, different frequencies. Thus, for example, every second pulse in one direction may be blocked and the rest permitted to pass, whereas in the other direction every fourth pulse, for example, may be blocked and the rest permitted to pass. This will be of utility in a variety of instances, such as in controlling the magnitudes of the total currents flowing in the two respective directions or such as in distinguishing between light segments intermittently but regularly passed by disks comprising perforated opaque material and rotating at speeds different with respect to each other.

Other arrangements or modifications will present themselves to persons acquainted with equipment of this sort and the foregoing embodiments are set forth only as illustrative and not as limiting, excepting as the hereinafter appended claims may expressly require otherwise.

I claim:

1. An electronic switch for making and breaking an electrical connection between a pair of spaced terminals in an alternating current circuit, the combination comprising: a pair of rectifiers having their negative sides respectively connectable to said terminals and their positive sides connected to each other; a pair of gas-filled electric discharge devices each having an anode, a cathode and a control electrode; means for connecting the anode of each of said electric discharge devices, respectively, to each of said terminals; means connecting the cathode of each of said electric discharge devices to each other and further means connecting said cathodes to the positive sides of said rectifiers; a source of blocking potential of relatively low value with respect to that of such portions of said alternating current as said switch is intended to pass and having negative portions thereof in phase with said portions of said alternating current; means imposing said blocking potential simultaneously onto both of said grids in such relationship with said alternating current source that said blocking potential is at blocking magnitude with respect to the simultaneously instantaneous magnitude of the alternating current throughout the period when said switch is not intended to connect said terminals and is below said blocking magnitude at least at the beginning of the period when said switch is intended to connect said terminals.

2. An electronic switch comprising in combination: a pair of spaced terminals; a pair of rectifiers having their negative sides connected to said terminals and their positive sides connected to each other; a pair of gas-filled electric discharge devices each having an anode, a cathode and a control electrode; means connecting the anode of each of said electric discharge devices, respectively, to each of said terminals; means connecting the cathode of each of said electric discharge devices to each other and further means connecting said cathodes to the positive sides of said rectifiers; a source of constant potential and a resistance circuit including a switch connecting the terminals of said source, said switch being between the positive side of said source and said resistance; means connecting a point between the negative side of said source and said resistance with the control electrodes of both of said electric discharge devices; and means connecting a point between said switch and said resistor to the cathodes of each of said thyratrons.

References Cited in the file of this patent

UNITED STATES PATENTS

| Number | Name | Date |
|---|---|---|
| 2,269,442 | Dench | Jan. 13, 1942 |
| 2,271,738 | Leftwich | Feb. 3, 1942 |
| 2,290,657 | Vedder | July 21, 1942 |
| 2,462,326 | Manoog | Feb. 22, 1949 |
| 2,474,886 | Bovey | July 5, 1949 |